Feb. 26, 1935.  J. H. COOPER  1,992,859
ARC WELDING
Filed Sept. 17, 1932
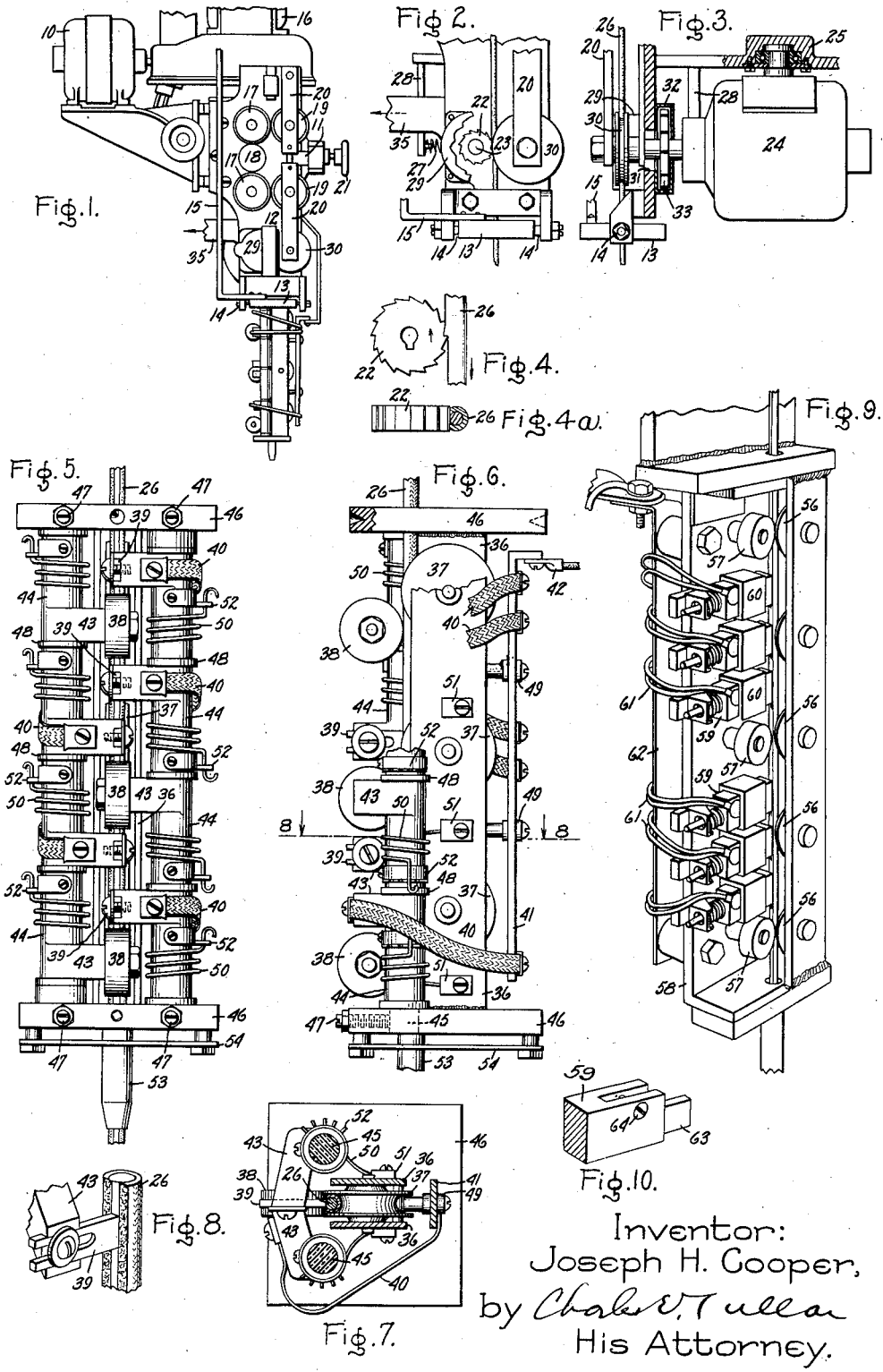
Inventor:
Joseph H. Cooper,
by Charles V. Tullar
His Attorney.

Patented Feb. 26, 1935

1,992,859

UNITED STATES PATENT OFFICE 1,992,859

ARC WELDING

Joseph H. Cooper, Schenectady, N. Y., assignor to General Electric Company, a corporation of New York Application September 17, 1932, Serial No. 633,648

12 Claims. (Cl. 219—8)

My invention relates to arc welding, and particularly to arc welding machines for automatically feeding coated electrodes toward and away from the work, to strike and thereafter maintain a welding arc.

In order to improve their arcing characteristics as well as the quality of the weld metal, welding electrodes are often coated with materials called fluxes. Very often these coatings are of considerable thickness and electrically insulate the electrodes rendering them unsuited for use in automatic machines in which the welding current is fed to the surface of the electrode at a predetermined point as it is fed through the machine to the work. Heavily coated electrodes are generally supplied in short lengths with one end thereof bared for insertion in a holder by means of which welding current is fed thereto.

It is an object of my invention to provide a welding machine of improved construction for feeding heavily coated electrodes of considerable length into and out of engagement with the work, to strike and thereafter maintain an arc and for supplying welding current to said electrodes as they are fed to and from the work.

It is a further object of my invention to provide an improved contact making mechanism for supplying welding current to an electrode.

Further objects of my invention will become apparent from the following description taken in connection with the accompanying drawing in which Fig. 1 is a side view of an automatic arc welding machine embodying my invention; Figs. 2, 3, 4 and 4a are detailed views of the means provided in the machine illustrated in Fig. 1 for removing a longitudinal portion of the flux coating of the welding rod fed by said machine; Figs. 5, 6 and 7 show a front, a side and a sectional view along line 8—8 of Fig. 6 of the mechanism employed in Fig. 1 for supplying welding current to the electrode; Fig. 8 is a detailed view of a brush employed in the mechanism of Figs. 5, 6 and 7; Fig. 9 is a perspective view of another mechanism for feeding welding current to an electrode in accordance with my invention, and Fig. 10 is a detailed view of a brush employed in the mechanism illustrated in Fig. 9.

The welding head shown in Fig. 1 is of the type illustrated, described and claimed in application, Serial No. 611,858, Lionel G. Pickhaver and William W. Worley, Jr., filed May 17, 1932, for Arc welding, and assigned to the same assignee as the present application. It comprises a motor 10 by means of which a feeding mechanism 11 is operated to feed an electrode to the work through a flux removing means 12 and a contact mechanism 13 for supplying welding current thereto. The contact mechanism 13 is pivotally supported at 14 and may be oscillated about its pivot through the agency of a connecting rod 15 operated by a motor 16.

The feeding mechanism illustrated in Fig. 1 comprises a plurality of feed rolls 17 which are driven by a pinion 18 connected through gearing and shafting to the feed motor 10. The electrode is held in engagement with feed rolls 17 by pressure rolls 19 supported on pivoted levers 20 against which an adjusting screw 21 operates to force them into engagement with the electrode. This feeding mechanism per se forms the subject matter of application Serial No. 758,043, Verni J. Chapman, filed December 18, 1934, for Wire feeding apparatus, and assigned to the same assignee as the present application.

The construction of the flux removing means is illustrated in Figs. 2, 3, 4 and 4a. As there illustrated, it comprises a milling cutter 22 mounted on the end of a shaft 23 of a motor 24. The frame of this motor is pivotally supported at 25 from a portion of the frame of the welding head, and the cutter is biased into engagement with the electrode 26 by a compression spring 27 located between the motor and a bracket 28 attached to the welding head. The cutter is enclosed in a housing 29 one end of which is closed by a roller 30 which is located opposite the cutter and serves to back up the electrode. This housing is connected through an opening 31 to a fan housing 32 which encloses a fan 33 also mounted on shaft 23 of motor 24. The construction is such that the fragments of flux coating removed from the electrode by cutter 22 are sucked from the housing 29 and discharged by the fan through a conduit 35 which may carry this material to a point remote from the machine.

As shown in Figs. 4 and 4a the cutter is of such thickness as to remove from the surface of the electrode a longitudinal segmental portion of its flux coating. An opening is thus produced in the flux coating of greater width than the means employed for supplying welding current to the electrode and lateral movement of the electrode relative thereto may take place without interference with the means employed for supplying current to the electrode. When brushes having the construction described below are employed their life is greatly increased and their operating characteristics greatly improved by providing an opening in the flux having a width substantially greater than the width of the brushes.

The contact mechanism illustrated in Figs. 5, 6 and 7 comprises a plurality of members 36 between which are supported a plurality of flanged rolls 37 against which the electrode 26 is held by pressure rolls 38 located opposite them. Welding current is supplied to the electrode through brushes 39 connected by flexible conductor 40 to a bus 41 to which the welding current is supplied by a conductor 42. Bus 41 is provided with a plurality of longitudinally spaced contact points and is made of a material of sufficient resistance to divide the welding current equally between the several conductors 40 when they are connected thereto in proper spaced relationship relative to one another. Each brush is slotted and may be adjusted on its support to compensate for wear.

Rolls 38 and brushes 39 are supported on arms or pressure fingers 43 having offset hub portions 44 which are mounted on rods 45 extending between end-plates 46 to which members 36 are attached. Members 36 and end-plates 46 form a framework into which rods 45 are inserted and held in place by set screws 47. The pressure fingers are assembled on rods 45 in such manner that the offset hub portions on one rod are opposite the pressure fingers on the other rod. By adopting this construction a very compact arrangement of parts is secured. The elongated bearing surface between the arms or pressure fingers 43 and the rods 45 effectively resists the twisting forces applied to the arms by reason of the longitudinal movement of the electrode past the brushes 39 attached to these arms. The adequate bearing surface thus provided also enables the arms to turn freely about the pivotal support parallel to the electrode furnished by the rods. Each finger is insulated from the other fingers and the framework of the contact mechanism by making the rods 45 of an insulating material and by separating the fingers from one another and the framework by insulating washers 48. Bus 41 is also insulated from the framework at its points of attachment 49.

The pressure fingers are biased toward the electrode by springs 50 surrounding the offset hub portions 44 thereof. One end of each spring is attached by a clamp 51 to one of the members 36 and the other end is connected to the pressure finger through a notched strip 52 secured thereto. By adjusting the position of the end of the spring in the notched strip the tension of the spring and the pressure of the finger may be adjusted. The pressure applied to the electrode through rolls 38 should be sufficient to straighten the electrode and force it into firm engagement with the flanged rolls 37 which are alined with one another. The brush pressure should be sufficient to produce a firm non-sparking engagement with the electrode.

The electrode is fed from the contact mechanism to the work through a nozzle 53. The end-plate 46 nearest the work may be provided with a shielding plate 54 to protect the contact mechanism from the intense heat of the welding arc. If desired, the mechanism may be enclosed by a cover supported on end-plates 46.

The contact mechanism above described functions as follows:—The electrode 26 is supported and guided relatively to brushes 39 by rolls 37 and 38 which engage the curved and flattened surfaces of the electrode as it leaves cutter 22. Current is fed in equal amounts to the electrode through these brushes which are located closely adjacent the pressure rolls 38 and near the arcing terminal of the electrode.

In Fig. 9 I have illustrated a modified arrangement employing certain features of my invention. In the contact mechanism there illustrated the electrode is held against grooved rolls 56 by flat surfaced pressure rolls 57 which are mounted on a plate 58 which is bodily adjustable to and from the framework supporting rolls 56. This framework also supports a plurality of brushes 59 which are held in brush holders 60 attached to plate 58. Each brush is connected through a flexible conductor 61 to a bus member 62 as in the embodiment shown in Figs. 5, 6 and 7. The bus 62 is of sufficient resistance to cause the welding current to divide equally between the several conductors 61 when these conductors are properly connected thereto. A plurality of points of connection are provided in bus 62 for accomplishing this result. Each brush comprises a block of conducting material to which the conductor 61 is attached. The blocks are slotted as illustrated in Fig. 10 for the reception of a blade 63 which is clamped in place therein by a screw 64.

I prefer to have the parts of my automatic feeding device so arranged that the bared portion of the electrode is at its rear so that the small globules of weld metal discharged from the end of the electrode will be directed into the pool of molten metal located below and to the rear of the electrode. It is possible, however, to operate equally satisfactory, as far as arcing conditions are concerned, with the bared portion of the electrode constituting the front side of the electrode.

The arrangement illustrated in Figs. 5, 6 and 7 is preferred to that illustrated in Fig. 9 because of the more compact arrangement of parts. It is desirable to feed the welding current into the electrode as near as possible to its arcing terminal and, by employing an arrangement such as illustrated in Figs. 5, 6 and 7 the length of the contact making mechanism may be greatly reduced. When feeding straight electrode material the pressure rolls 38 may be omitted from the contact mechanisms above described. Although I prefer to mount the several pressure fingers for independent movement on their supporting rod 45, such a construction is not necessary since the several pressure fingers may be connected and moved in unison by a single means. Furthermore, these supporting rods may be made of a conducting material and suitably insulated from the pressure fingers by a tubular bushing of insulating material. These and other changes will occur to those skilled in the art and may be employed without departing from the spirit and scope of my invention.

What I claim as new and desire to secure by Letters Patent of the United States is:

1. Arc welding apparatus comprising means for feeding a coated electrode, means for producing in the coating of said electrode a longitudinal opening extending through said coating, and means having a width less than the width of said opening for supplying welding current to said electrode.

2. Arc welding apparatus comprising means for feeding a coated electrode, means for removing from the surface of said electrode a segmental portion of its flux coating, and means for making a sliding contact with the surface of said electrode exposed by said last-mentioned means.

3. Arc welding apparatus comprising means for feeding a coated electrode, means for removing from the surface of said electrode a segmental portion of its flux coating, means including a plurality of grooved and flat surfaced rolls adapted to engage the curved and flattened surfaces of said coated electrode for directing it from said last-mentioned means to the work, and means adjacent said rolls for supplying welding current to said electrode through the surface thereof exposed by said flux removing means.

4. Arc welding apparatus comprising means for longitudinally feeding a welding electrode, a rod parallel to said electrode, an arm having an elongated bearing surface on said rod, a brush supported by said arm, means for biasing said arm toward said electrode, and means for supplying welding current to said brush.

5. Contact making mechanism for supplying welding current to an electrode comprising electrode guiding means, a brush, means, including an arm pivotally supported about an axis parallel to the electrode supported in said guiding means, for holding said brush in engagement with said electrode, and means for supplying welding current to said brush.

6. Contact making mechanism for supplying welding current to an electrode comprising a flanged roll, a brush opposite said flanged roll, means, including an arm pivotally supported about an axis parallel to an electrode backed by said flanged roll, for holding said brush in engagement with said electrode, and means for supplying welding current to said brush.

7. Contact making mechanism for supplying welding current to an electrode comprising a plurality of flanged backing rolls, means for supporting said rolls in alinement with one another, a plurality of pressure rolls for holding an electrode in engagement with the said backing rolls, a plurality of brushes between said pressure rolls, means for supplying welding current to said brushes, and means for yieldingly supporting said brushes in engagement with an electrode fed between said rolls.

8. Contact making mechanism for supplying welding current to an electrode comprising a plurality of flanged rolls, means for supporting said rolls in alinement with one another, a plurality of pressure rolls opposite said flanged rolls, a plurality of brushes opposite said flanged rolls, means including a plurality of independently movable pressure fingers for supporting said pressure rolls and brushes in alinement with one another, means for supplying welding current to said brushes, and means for independently adjusting the pressures of said fingers.

9. Contact making mechanism for supplying welding current to an electrode comprising a plurality of flanged rolls, means for supporting said rolls in alinement with one another, a plurality of pressure rolls opposite said flanged rolls, a plurality of brushes opposite said flanged rolls, means, including a plurality of pressure fingers having offset hub portions supported on rods with the offset hub portions on one rod being opposite the pressure fingers on another rod, for supporting said pressure rolls and brushes in alinement with one another, means for supplying welding current to said brushes, springs surrounding the offset portions of said pressure fingers, and means for independently adjusting the tensions of said springs for adjusting the pressures of said fingers.

10. Arc welding apparatus comprising means for feeding a coated electrode, a motor having a cutter supported on its axle, means for pivotally supporting said motor with said cutter opposite the electrode fed by said feeding means, means for biasing said cutter into engagement with said electrode, and means for supplying welding current to the surface of said electrode exposed by the removal of a longitudinal section of its flux coating by said cutter.

11. Contact making mechanism for supplying welding current to an electrode comprising a plurality of rods parallel to one another and to said electrode, arms having offset hub portions supported on said rods with the offset hub portion on one rod being opposite to the arm on another rod, aligned brushes supported on said arms, means for supplying welding current to said brushes, and means for biasing said arms toward said electrode.

12. Contact making mechanism for supplying welding current to an electrode comprising a plurality of rods parallel to one another and to said electrode, arms having offset hub portions supported on said rods with the offset hub portion on one rod being opposite to the arm on another rod, aligned brushes supported on said arms, means for supplying welding current to said brushes, means including springs surrounding the offset hub portions of said arms for biasing said arms toward said electrode, and means for independently adjusting the tension of said springs.

JOSEPH H. COOPER.